United States Patent
Lenfert et al.

(10) Patent No.: US 11,076,530 B2
(45) Date of Patent: Aug. 3, 2021

(54) RIVETED JOINT AND METHOD OF FORMING THE SAME

(71) Applicant: Honda Motor Co., Ltd., Tokyo (JP)

(72) Inventors: Nathaniel Artemis Lenfert, Graham, NC (US); Andrew Edwin Bejcek, Chapel Hill, NC (US); Scott Kaskawitz, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 16/355,038

(22) Filed: Mar. 15, 2019

(65) Prior Publication Data

US 2020/0288633 A1    Sep. 17, 2020

(51) Int. Cl.
| | |
|---|---|
| *F16B 5/04* | (2006.01) |
| *A01D 34/74* | (2006.01) |
| *A01D 34/67* | (2006.01) |
| *B21J 15/02* | (2006.01) |
| *F16B 19/06* | (2006.01) |
| *A01D 101/00* | (2006.01) |

(52) U.S. Cl.
CPC ............ *A01D 34/74* (2013.01); *A01D 34/67* (2013.01); *B21J 15/02* (2013.01); *F16B 5/04* (2013.01); *F16B 19/06* (2013.01); *A01D 2101/00* (2013.01)

(58) Field of Classification Search
CPC .. F16B 5/40; F16B 5/045; F16B 19/06; F16B 5/0096; B21J 15/02; A01D 34/74
See application file for complete search history.

(56) References Cited

U.S. PATENT DOCUMENTS

| | | | | | |
|---|---|---|---|---|---|
| 1,731,469 | A | * | 10/1929 | Mansfield | E04B 1/6104 52/520 |
| 3,615,274 | A | * | 10/1971 | Belada | B21D 39/00 428/594 |
| 5,092,723 | A | | 3/1992 | Compton et al. | |
| 5,499,440 | A | * | 3/1996 | Satoh | B21K 25/00 29/512 |
| 5,690,459 | A | * | 11/1997 | Donovan | F16B 17/006 29/509 |
| 6,732,420 | B2 | | 5/2004 | Wang et al. | |

(Continued)

FOREIGN PATENT DOCUMENTS

| | | |
|---|---|---|
| CN | 201851441 U | 6/2011 |
| CN | 202510472 U | 10/2012 |

*Primary Examiner* — Flemming Saether
(74) *Attorney, Agent, or Firm* — Armstrong Teasdale LLP (57) ABSTRACT

A riveted joint is described herein. The riveted joint includes a first component and a second component. The first component includes a first opening, and a plurality of first tabs and a plurality of first notches defined along a periphery of the first opening. The second component includes a second opening aligned with the first opening. The second component further includes a plurality of second tabs defined along a periphery of the second opening, wherein at least one second tab is aligned with at least one first notch to define an interlock zone when the first and second components are in a predetermined orientation relative to each other. The joint also includes a rivet extending through the first and second openings. The rivet is configured to secure the at least one second tab within the at least one first notch such that the first and second components are rotationally interlocked.

20 Claims, 8 Drawing Sheets

(56) References Cited

U.S. PATENT DOCUMENTS

| | | | |
|---|---|---|---|
| 8,448,324 B2* | 5/2013 | Berger | B21D 39/031 |
| | | | 29/521 |
| 8,870,505 B2* | 10/2014 | Tsai | F16B 37/065 |
| | | | 411/34 |
| 9,017,017 B2 | 4/2015 | Sausse et al. | |
| 9,611,751 B1 | 4/2017 | Zagone et al. | |
| 2010/0260597 A1 | 10/2010 | Sausse et al. | |
| 2016/0252118 A1 | 9/2016 | Babe et al. | |
| 2017/0081975 A1 | 3/2017 | Zagone et al. | |

* cited by examiner

RIVETED JOINT AND METHOD OF FORMING THE SAME

BACKGROUND

The present disclosure relates generally to mechanical joints and, more specifically, to a riveted joint having improved holding capacity and torque transfer capability.

At least some known walk-behind lawnmowers include a housing including a bottom opening, front and rear wheels coupled to the housing, a blade rotatable within the housing, and a handle that enables an operator to steer the lawnmower. The lawnmower also includes a height-adjusting mechanism that adjusts a height of the front and rear wheels relative to the housing to control the mowing height. Height adjusting mechanisms may include a rotatable lever and a locking mechanism. The height of the housing is adjusted based on a degree of rotation of the rotatable lever, and the locking mechanism holds the lever in a desired rotational position. The components of the lawnmower may be secured together by one or more riveted joints.

Riveting is a process that includes inserting a shaft portion of a bolt through openings defined in the components to be joined, and deforming the shaft portion to clamp the components together via the bolt. In some riveted joints, the openings are shaped with a standard geometric profile such as a hex opening that is defined by at least two straight edges that intersect to form a corner. During a riveting process, deforming the shaft portion of the bolt enables material of the bolt to fill the corner such that the joint is provided with torque transfer capabilities. However, using standard geometric shapes for the openings can limit the joint's torque transfer capability.

BRIEF DESCRIPTION

In one aspect, a riveted joint is provided. The riveted joint includes a first component and a second component. The first component includes a first opening, and a plurality of first tabs and a plurality of first notches spaced about a periphery of the first opening. The second component includes a second opening aligned with the first opening. The second component further includes a plurality of second tabs defined about a periphery of the second opening, wherein at least one second tab is aligned with at least one first notch to define an interlock zone when the first and second components are in a predetermined orientation relative to each other. The joint also includes a rivet extending through the first and second openings, wherein the rivet is configured to secure the at least one second tab within the at least one first notch such that the first and second components are rotationally interlocked.

In another aspect, wheeled apparatus is provided. The wheeled apparatus includes a housing and an axle assembly coupled to the housing. The axle assembly includes a first plate and a lever. The first plate includes a first opening, wherein a plurality of first tabs and a plurality of first notches are spaced about a periphery of the first opening. The lever includes a second opening aligned with the first opening. A plurality of second tabs are defined about a periphery of the second opening, wherein at least one second tab is aligned with at least one first notch to define an interlock zone when the first plate and the lever are in a predetermined orientation relative to each other. The axle assembly also includes an axle including a first rivet end extending through the first and second openings, wherein the first rivet end is configured to secure the at least one second tab within the at least one first notch such that the first plate and the lever are rotationally interlocked.

In yet another aspect, a method of forming a riveted joint is provided. The method includes aligning a first opening of a first component with a second opening of a second component, wherein a plurality of first tabs and a plurality of first notches are spaced about a periphery of the first opening, and wherein a plurality of second tabs and a plurality of second notches are defined along a periphery of the second opening. The method also includes orienting the first and second components such that at least one second tab is aligned with at least one first notch, extending a rivet through the first and second openings, and applying a force to the rivet such that the at least one second tab is secured within the at least one first notch for rotationally interlocking the first and second components.

DETAILED DESCRIPTION

The embodiments described herein relate generally to a riveted joint having improved holding capacity and torque transfer capability. More specifically, the joint described herein includes a first component, a second component, and a rivet extending through openings defined in the first and second components. The components each include one or more discrete physical features defined about a periphery of the openings that enable the first and second components to be rotationally interlocked. For example, in one embodiment, each opening has a non-standard geometric shape that includes a plurality of tabs and notches defined about its periphery. The tabs and notches are arranged in a predetermined pattern that enables at least one tab on the second component is aligned with a notch on the first component when the first and second components are in a predetermined orientation relative to each other. As such, when a riveting process is performed on the joint, the tab is biased towards the first component for insertion into the notch. Thus, the components are rotationally interlocked and a more robust joint with improved torque transfer capacity is formed. The resulting joint may be used in equipment where enhanced strength and durability is desired.

Figure 1:
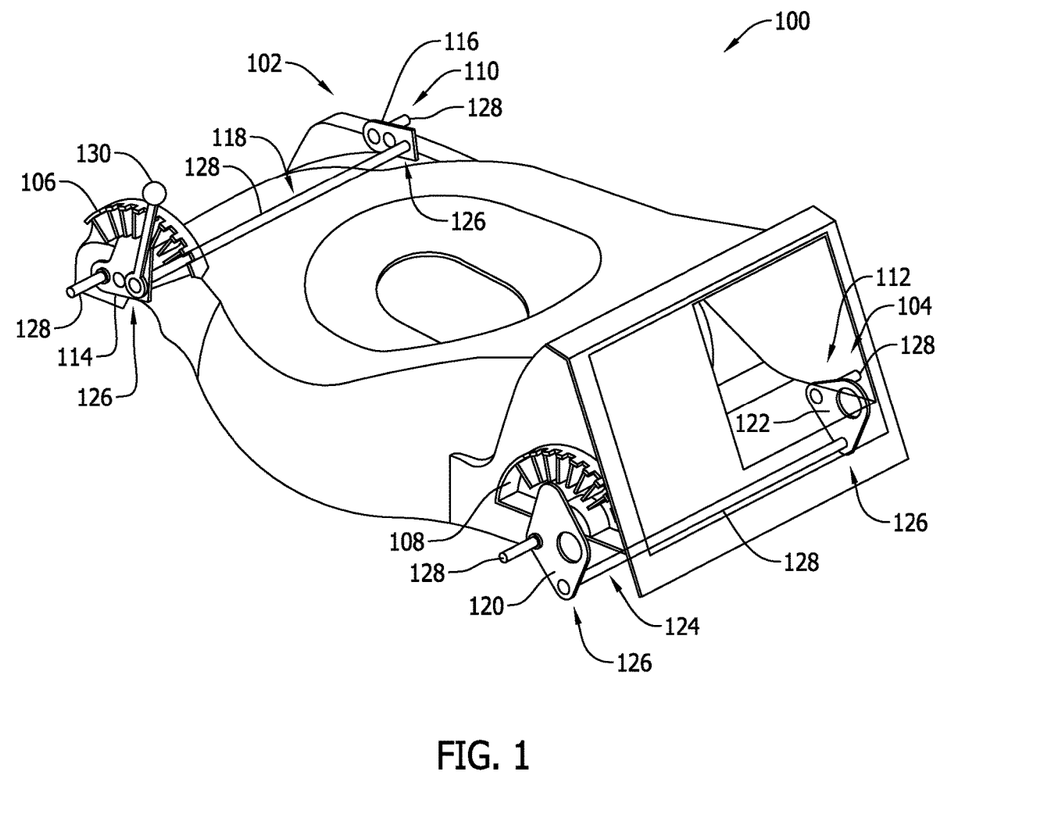
FIG. 1 is a perspective view of an exemplary lawnmower housing.

FIG. 1 is a perspective view of an exemplary lawnmower housing 100 for use in a wheeled apparatus. In the exemplary embodiment, lawnmower housing 100 includes a front end 102 and a rear end 104. Front end 102 includes a front wheel locking mechanism 106, and rear end 104 includes a rear wheel locking mechanism 108. A front axle assembly 110 is coupled to front end 102 of housing 100, and a rear axle assembly 112 is coupled to rear end 104 of housing 100. Front axle assembly 110 includes a first plate 114, a second plate 116, and a first axle 118 extending therebetween. Rear axle assembly 112 includes a third plate 120, a fourth plate 122, and a second axle 124 extending therebetween. Each axle 118 and 124 includes a pair of rivet ends 126, and a shaft 128 extending therebetween. Rivet ends 126 facilitate forming a riveted joint (not shown in FIG. 1), as will be described in more detail below. Each plate 114, 116, 120, and 122 has a wheel bolt 128 coupled thereto. Wheel bolt 128 enables a wheel (not shown) to be mounted to housing 100. Front axle assembly 110 also includes a lever 130 coupled to first plate 114, as will be described in more detail below. Lever 130 enables front axle assembly 110 to be rotated relative to housing 100, and lever 130 is capable of engagement with front wheel locking mechanism 106 to retain lever 130 in a desired rotational position.

Figure 2:
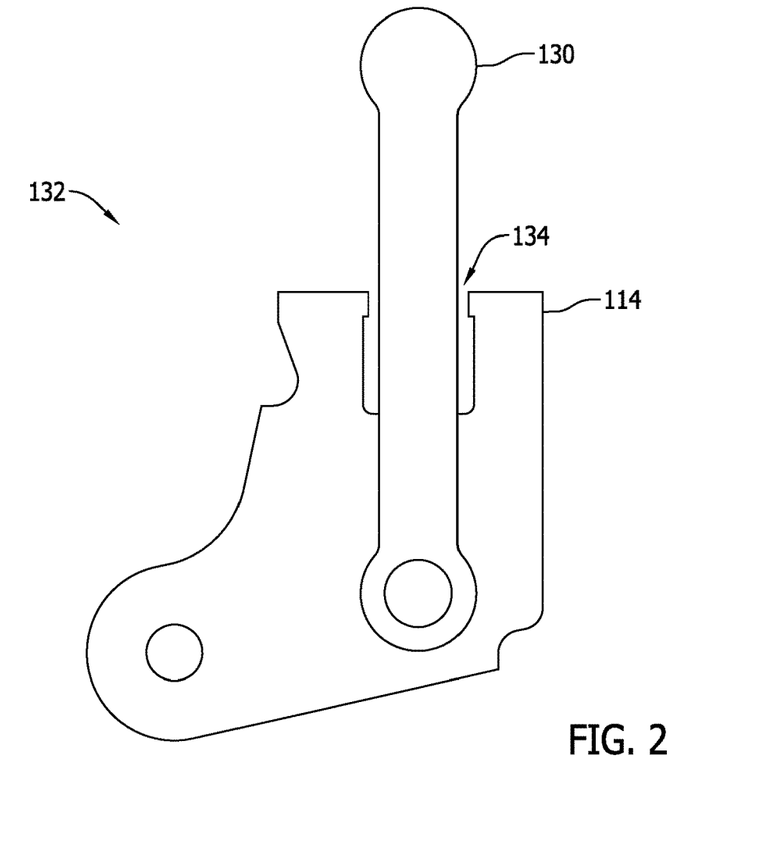
FIG. 2 is a side view of an exemplary joint that may be used with the lawnmower housing shown in FIG. 1.

FIG. 2 is a side view of an exemplary joint 132 that may be used with lawnmower housing 100 (shown in FIG. 1). In the exemplary embodiment, joint 132 includes first plate 114 (i.e., a first component), lever 130 (i.e., a second component), and a rivet 170 (i.e., rivet end 126) that facilitates coupling first plate 114 and lever 130 together. First plate 114 includes a slot 134 sized to receive a portion of lever 130 therein. First plate 114 and lever 130 are in a predetermined orientation relative to each other when lever 130 is inserted within slot 134.

Figure 3:
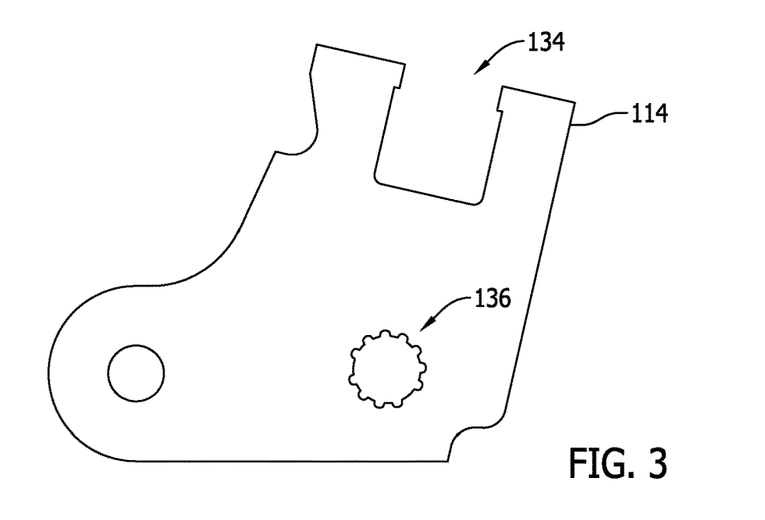
FIG. 3 is an illustration of an exemplary plate that may be used with the joint shown in FIG. 2.
Figure 4:
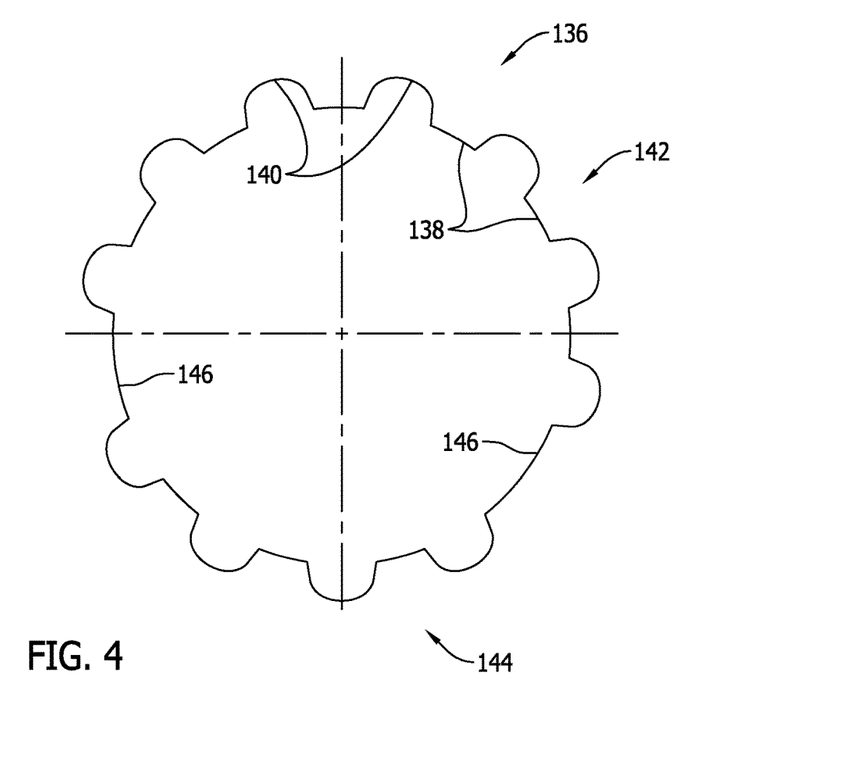
FIG. 4 is an enlarged view of an exemplary opening defined in the plate shown in FIG. 3.

FIG. 3 is an illustration of an exemplary first plate 114 that may be used with joint 132 (shown in FIG. 2), and FIG. 4 is an enlarged view of an exemplary opening 136 defined in first plate 114. Opening 136 may have any shape that enables joint 132 to function as described herein. In one embodiment, opening 136 is generally circular and has a non-standard geometric shape. For example, opening 136 is shaped with a plurality of distinct physical features defined along its periphery to enable first plate 114 to be selectively engaged, or fully engaged, with physical features of lever 130 (shown in FIG. 1). As used herein, the term "selectively engaged" and variants thereof refers to simultaneous engagement and non-engagement of physical features in different circumferential regions about opening 136 when riveted. As used herein, the term "fully engaged" and variants thereof refers to engagement of physical features along the entire periphery of opening 136 when riveted.

In the exemplary embodiment, a plurality of first tabs 138 and a plurality of first notches 140 are defined about the periphery of opening 136. Tabs 138 and notches 140 are arranged in an alternating arrangement with each other about the periphery of opening 136. That is, tabs 138 and notches 140 are spaced about the periphery of opening 136 such that each tab 138 is between a pair of circumferentially adjacent notches 140. In addition, tabs 138 and notches 140 are irregularly spaced about the periphery such that a first grouping 142 of tabs 138 and notches 140 is circumferentially offset from a second grouping 144 of tabs 138 and notches 140. First grouping 142 and second grouping 144 are separated by an elongated tab 146 that has a longer circumferential length than a circumferential length of the remaining tabs 138.

Figure 5:
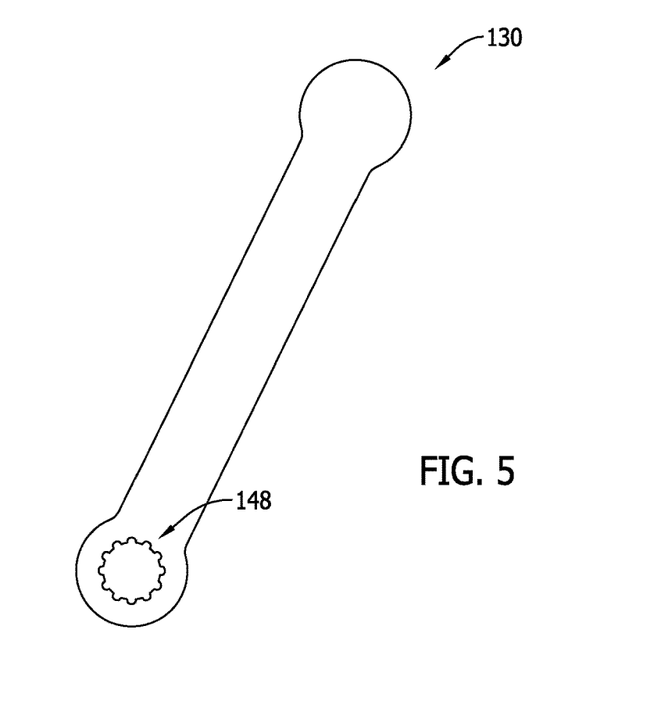
FIG. 5 is an illustration of an exemplary lever that may be used with the joint shown in FIG. 2.
Figure 6:
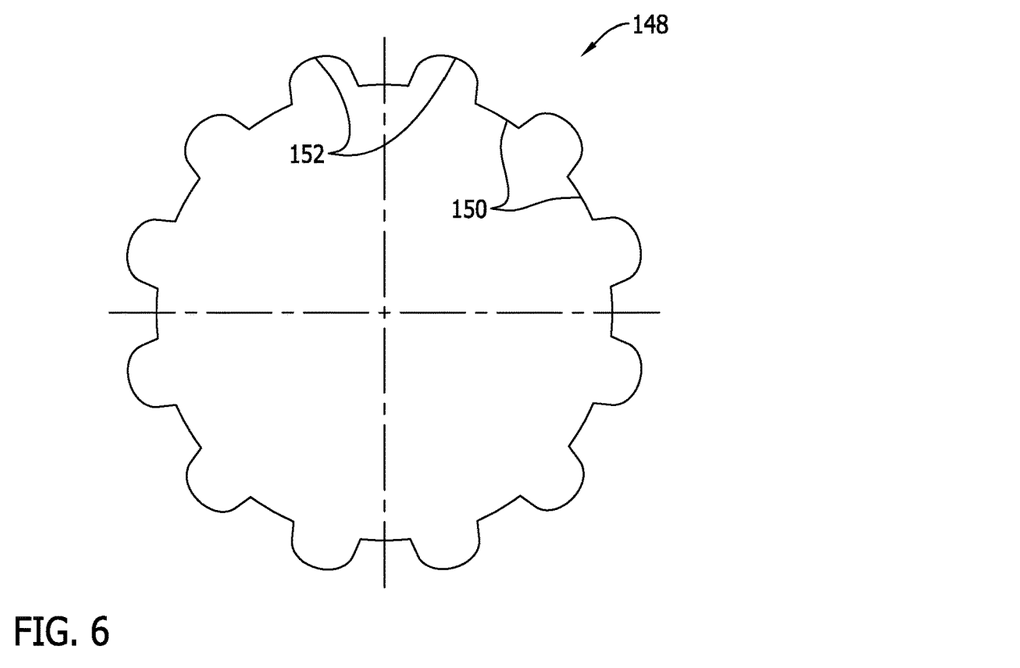
FIG. 6 is an enlarged view of an exemplary opening defined in the lever shown in FIG. 5.

FIG. 5 is an illustration of an exemplary lever 130 that may be used in joint 132 (shown in FIG. 2), and FIG. 6 is an enlarged view of an exemplary opening 148 defined in lever 130. Opening 148 has any shape that enables joint 132 to function as described herein. In one embodiment, opening 148 is generally circular and has a non-standard geometric shape. For example, opening 148 is shaped to define a plurality of distinct physical features about its periphery to enable lever 130 to be selectively engaged or fully engaged with physical features of first plate 114 (shown in FIG. 3). In the exemplary embodiment, a plurality of second tabs 150 and a plurality of second notches 152 are defined along the periphery of opening 148. Tabs 150 and notches 152 are alternatingly arranged with each other about the periphery of opening 148. That is, tabs 150 and notches 152 are spaced about the periphery of opening 148 such that each tab 150 is between a pair of circumferentially adjacent notches 152. In addition, tabs 150 and notches 152 are spaced substantially evenly about the periphery.

Figure 7:
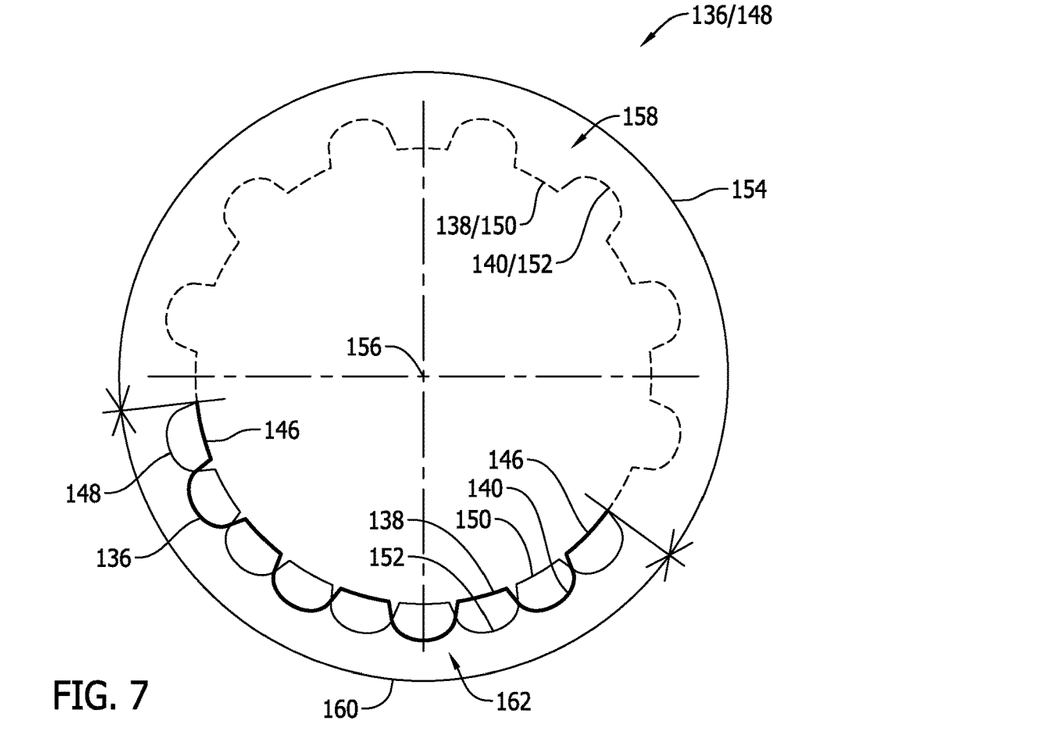
FIG. 7 is an exemplary overlay view defined by the openings shown in FIGS. 4 and 6.

FIG. 7 is an exemplary overlay view defined by openings 136 and 148 (shown in FIGS. 4 and 6). In the exemplary embodiment, first plate 114 and lever 130 are in the predetermined orientation relative to each other. Openings 136 and 148 are shaped to enable selective engagement to be achieved when first plate 114 and lever 130 are in the predetermined orientation relative to each other. For example, in the exemplary embodiment, at least one first tab 138 is aligned with at least one second tab 150, and at least one second tab 150 is aligned with at least one first notch 140, when first plate 114 and lever 130 are in the predetermined orientation relative to each other. First tabs 138 are aligned with second tabs 150 in a first circumferential region 154, relative to an alignment axis 156, to define a non-interlock zone 158. Second tabs 150 are aligned with first notches 140 in a second circumferential region 160, relative to alignment axis 156, to define an interlock zone 162. As such, non-interlock zone 158 and interlock zone 162 are defined at offset circumferential locations relative to openings 136 and 148.

As will be described in more detail below, alignment of first tabs 138 with second tabs 150 facilitates restricting deformation and biasing of lever 130 towards first plate 114 when lever 130 and first plate 114 are riveted together to form joint 132. In contrast, alignment of second tabs 150 with first notches 140 enables second tabs 150 to be deformed and biased towards first plate 114 for insertion within first notches 140. As such, when second tabs 150 are secured within first notches 140, first plate 114 is rotationally interlocked with lever 130. Interlocking first plate 114 and lever 130 facilitates enhancing the torque transfer capability of joint 132. In addition, securing second tabs 150 within first notches 140 facilitates increasing surface area contact between first plate 114 and lever 130, when compared to joints formed from components having standard geometric openings formed therein.

As noted above, non-interlock zone 158 and interlock zone 162 are defined at offset circumferential locations relative to openings 136 and 148. In some embodiments, riveting first plate 114 and lever 130 together to form joint 132 causes second tabs 150 to be intentionally deformed. However, the riveting process may also cause unintentional deformation of other portions of lever 130. For example, biasing second tabs 150 towards first plate 114 may cause other portions of lever 130 adjacent interlock zone 162 to bias away from first plate 114. In the exemplary embodiment, non-interlock zone 158 and interlock zone 162 are defined at predetermined circumferential locations relative to openings 136 and 148 such that non-interlock zone 158 is closer to slot 134 (shown in FIG. 3) than interlock zone 162 is to slot 134. As such, the portion of lever 130 extending towards slot 134 is restricted from being unintentionally deformed, and from being removed from slot 134.

In an alternative embodiment, first plate 114 and lever 130 may be fully engaged with each other in joints where any deformation of the second component does not adversely impact the joint.

Figure 8:
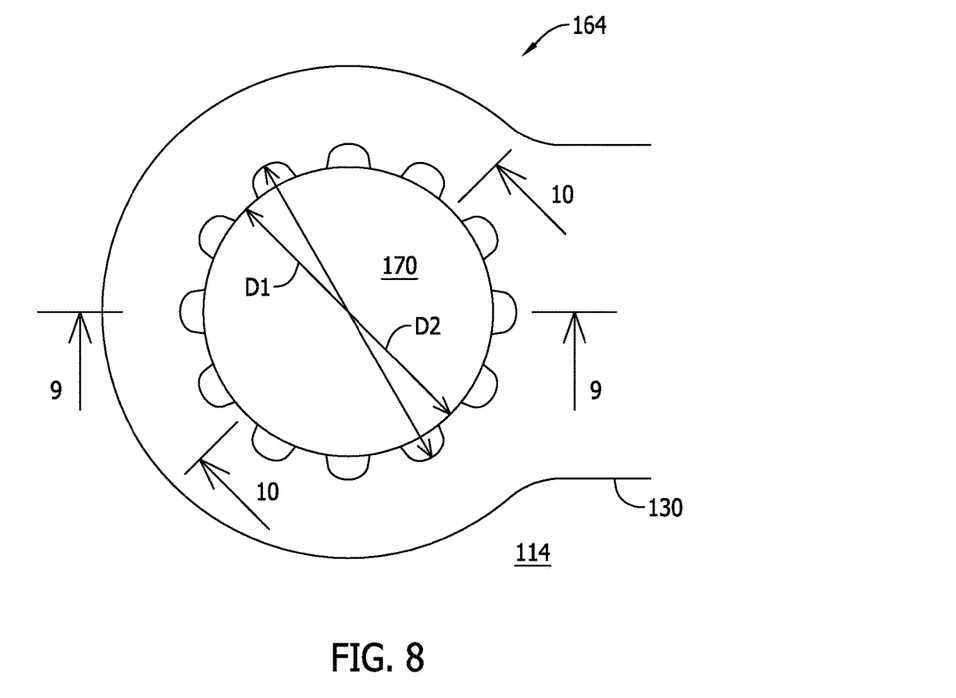
FIG. 8 is a side view of an exemplary pre-joint defined by the plate and lever shown in FIGS. 3 and 5.
Figure 9:
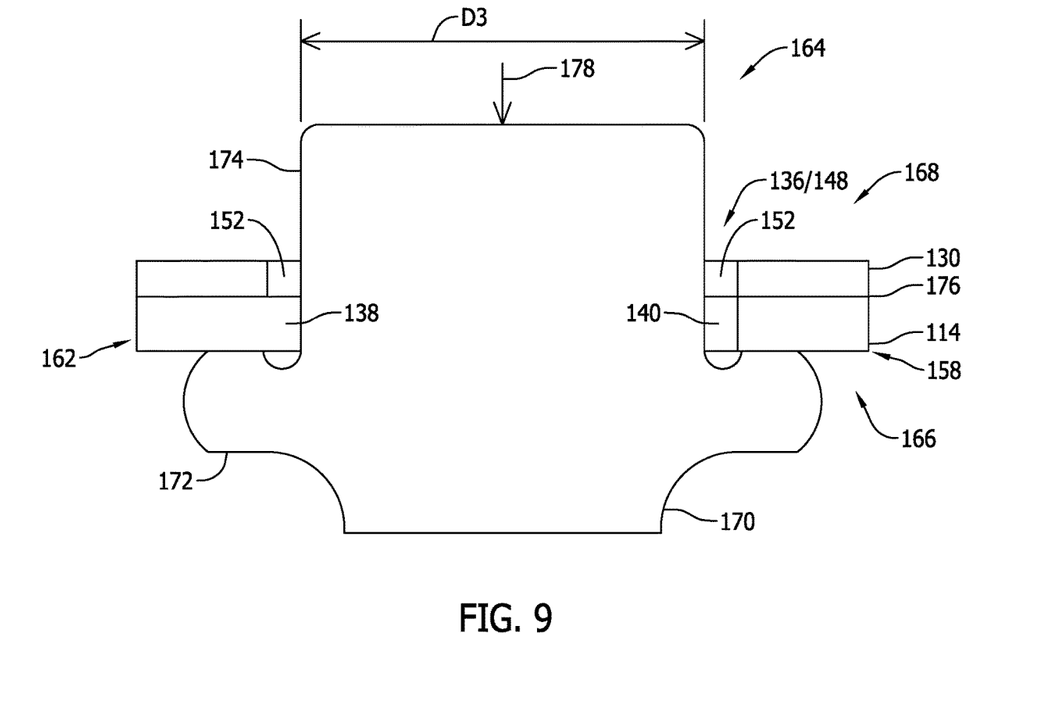
FIG. 9 is a cross-sectional view of the pre-joint shown in FIG. 8 and taken along line 9-9 shown in FIG. 8.
Figure 10:
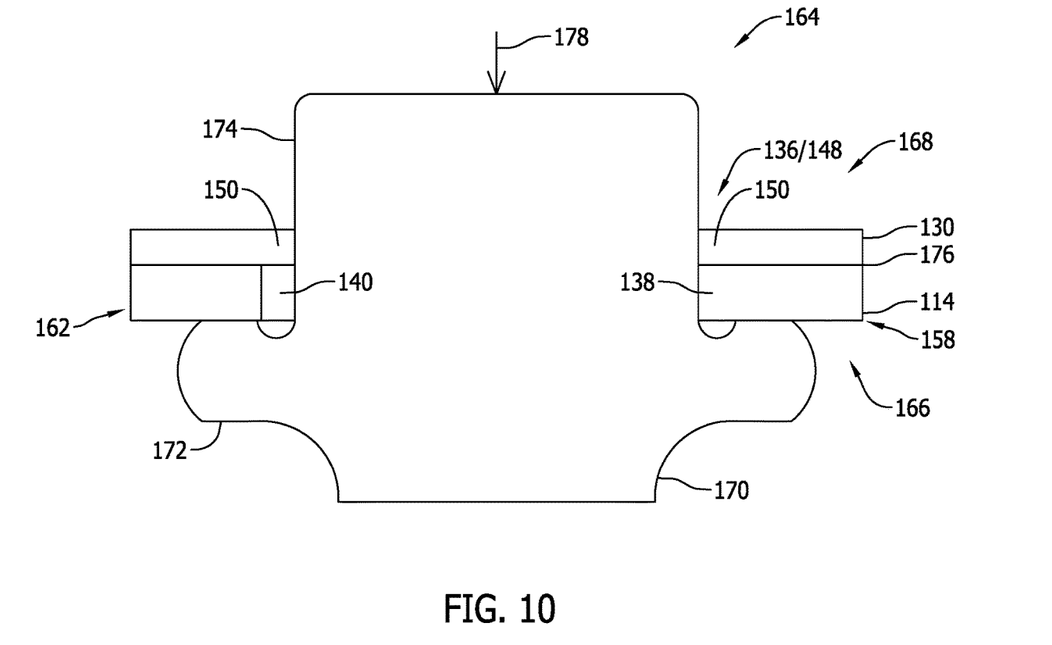
FIG. 10 is a cross-sectional view of the pre-joint shown in FIG. 8 and taken along line 10-10 shown in FIG. 8.
Figure 11:
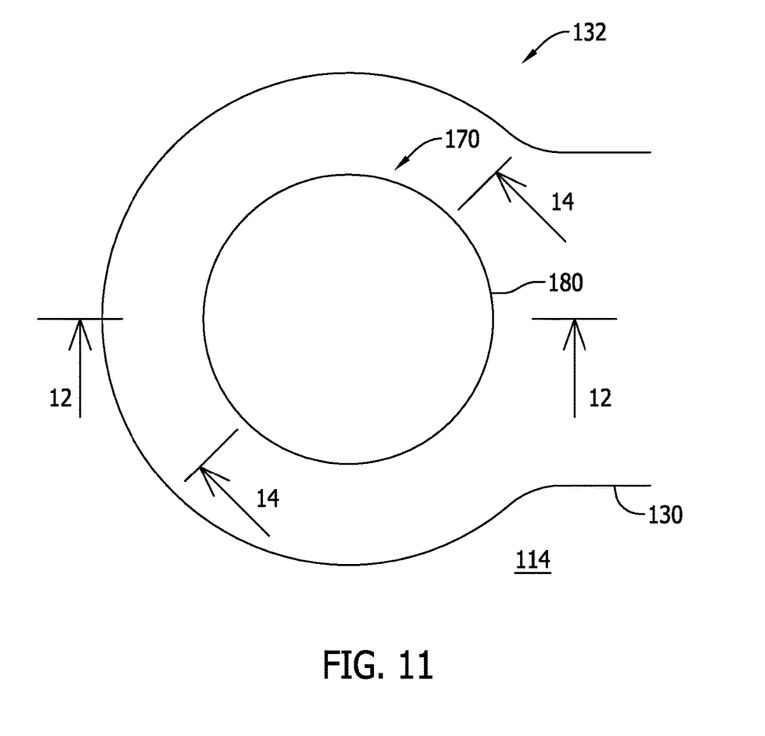
FIG. 11 is a side view of an exemplary joint defined by the plate and lever shown in FIGS. 3 and 5.

FIGS. 8-10 are various views of an exemplary pre-joint 164 defined by first plate 114 and lever 130. In the exemplary embodiment, first plate 114 is on a first side 166 of pre-joint 164, and lever 130 is on a second side 168 of pre-joint 164. First plate 114 is coupled to lever 130, and rivet 170 extends through first and second openings 136 and 148 thereof. For example, referring to FIGS. 9 and 10, rivet 170 includes a stopper portion 172 that abuts first plate 114, and a shaft portion 174 that extends through first and second openings 136 and 148.

In the exemplary embodiment, first and second openings 136 and 148 are defined by a first diameter $D_1$ and a second diameter $D_2$ that is larger than first diameter $D_1$. First diameter $D_1$ extends between diametrically-opposed tabs 138 or 150, and second diameter $D_2$ extends between diametrically-opposed notches 140 or 152. When initially inserted through first and second openings 136 and 148, rivet 170 is in a pre-processed state wherein a diameter $D_3$ (shown in FIG. 9) of shaft portion 174 is narrower than first diameter $D_1$.

Referring to FIG. 9, first plate 114 and lever 130 are in a face-to-face relationship such that an interface 176 is defined therebetween. In addition, first tab 138 is aligned with second notch 152 in interlock zone 162, and first notch 140 is aligned with second notch 152 in non-interlock zone 158. Referring to FIG. 10, first notch 140 is aligned with second tab 150 in interlock zone 162, and first tab 138 is aligned with second tab 150 in non-interlock zone 158.

FIGS. 11-14 are various views of joint 132 defined by first plate 114 and lever 130. In the exemplary embodiment, rivet 170 is in a processed condition caused as a force 178 (shown in FIGS. 9 and 10) is applied to rivet 170 to deform shaft portion 174. As shaft portion 174 is deformed, force 178 creates a head portion 180 of rivet 170 coupled to lever 130. As such, first plate 114 and lever 130 are secured between stopper portion 172 and head portion 180 along joint 132.

Figure 14:
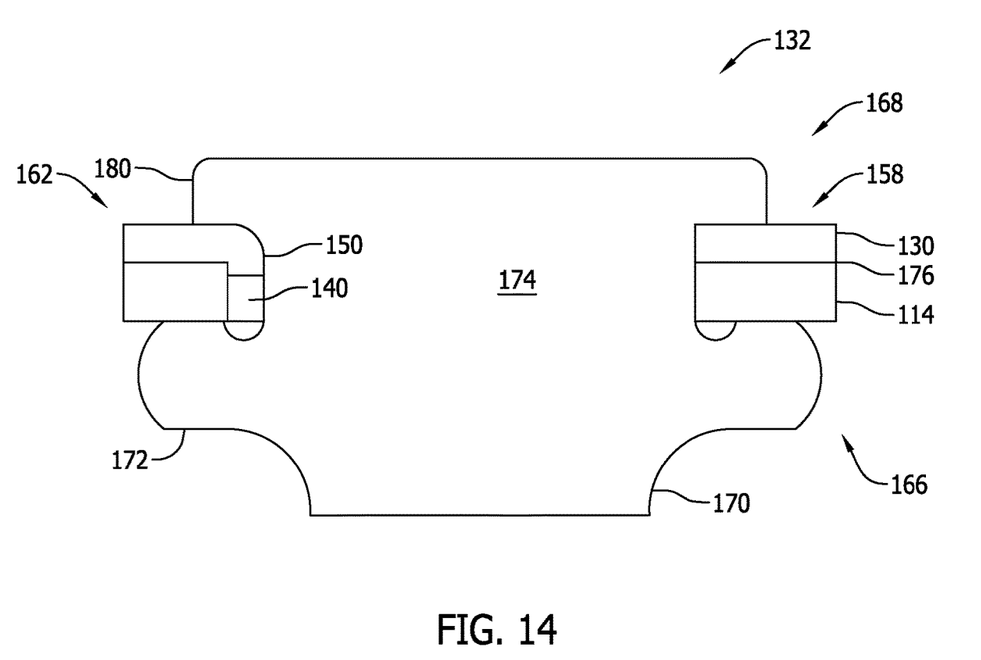
FIG. 14 is a cross-sectional view of the joint shown in FIG. 11 and taken along line 14-14 shown in FIG. 11.

Rivet 170 may be processed with any tool, or by any process, that enables joint 132 to function as described herein. For example, in one embodiment, force 178 is applied by performing an orbital riveting procedure on rivet 170. Force 178 may be applied from second side 168 of joint 132 to cause second tab 150 to be biased towards first plate 114. As such, and as shown in FIG. 14, second tab 150 is oriented to extend across interface 176 for insertion within first notch 140 as a result of performance of the riveting procedure. Thus, second tab 150 can engage first plate 114 to cause first plate 114 and lever 130 to be rotationally interlocked.

Figure 12:
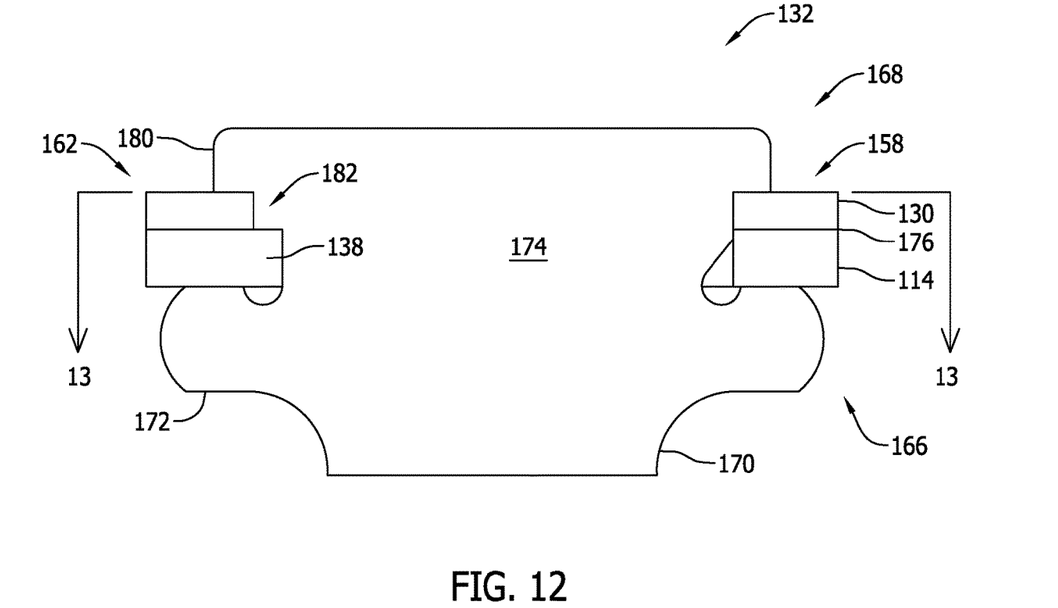
FIG. 12 is a cross-sectional view of the joint shown in FIG. 11 and taken along line 12-12 shown in FIG. 11.
Figure 13:
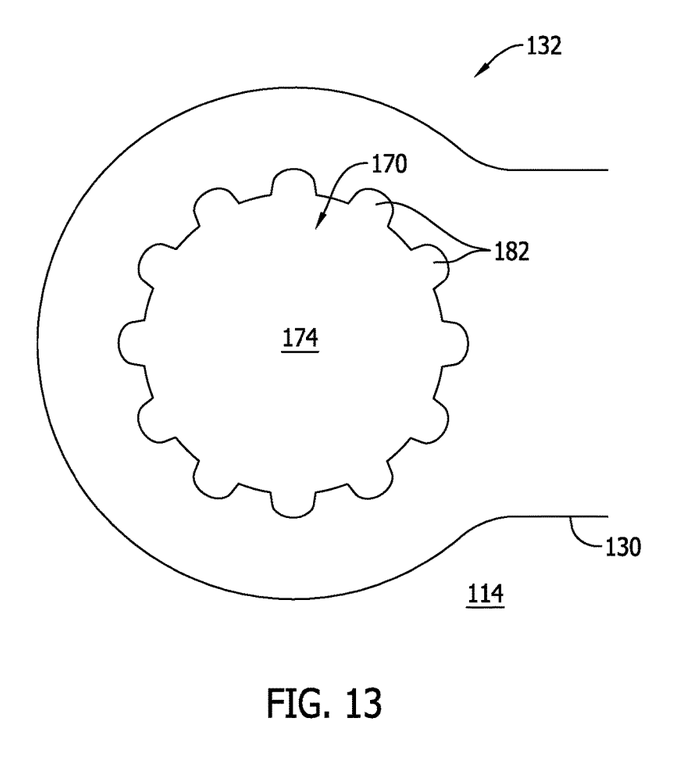
FIG. 13 is a side view of the joint shown in FIG. 11 and taken along line 13-13 shown in FIG. 12.

Referring to FIGS. 12 and 13, applying force 178 (shown in FIGS. 9 and 10) to rivet 170 also deforms shaft portion 174 and creates a plurality of radial projections 182 within second notches 152. As noted above, shaft portion 174 has diameter $D_3$ that is shorter than diameter $D_1$ when in a pre-processed state. Applying force 178 to rivet 170 causes shaft portion 174 to expand radially such that void spaces in lever 130 defined by second notches 152 are filled by radial projections 182. The plurality of second notches 152 are contoured to facilitate increasing an amount of surface on lever 130 that may engage with other components of joint 132. As such, the holding capacity and torque transfer capability of joint 132 is increased.

The embodiments described herein relate to mechanical joints, and methods of forming mechanical joints, that have an increased holding capacity and torque transfer capability. The apparatus and methods described herein accomplish the aforementioned objectives by shaping openings defined in components of the joint with a non-standard geometric shape. For example, the openings may be shaped to have a plurality of distinct physical features defined about the periphery of the opening. The physical features are oriented radially, for example, to provide enhanced surface area contact between the components of the joint. As such, power equipment manufactured using the mechanical joints described herein may have increased durability and an improved useful service life.

Exemplary embodiments of a riveted joint and related methods of processing are described above in detail. Although the systems herein described and illustrated in association with a walk-behind lawnmower, the invention is also intended for use with any equipment that includes a riveted joint. Moreover, it should also be noted that the components of the invention are not limited to the specific embodiments described herein, but rather, aspects of each component may be utilized independently and separately from other components and methods of assembly described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A riveted joint comprising:
   a first component comprising a first opening, and a plurality of first tabs and a plurality of first notches spaced about a periphery of the first opening;
   a second component comprising a second opening aligned with the first opening, the second component further comprising a plurality of second tabs defined about a periphery of the second opening, wherein at least one second tab is aligned with at least one first notch to define an interlock zone when the first and second components are in a predetermined orientation relative to each other; and
   a rivet extending through the first and second openings, wherein the rivet secures the at least one second tab within the at least one first notch such that the first and second components are rotationally interlocked.

2. The joint in accordance with claim 1, wherein the first and second components are in a face-to-face relationship such that an interface is defined therebetween, wherein the at least one second tab extends across the interface for insertion within the at least one first notch.

3. The joint in accordance with claim 1, wherein the second component comprises a plurality of second notches and the plurality of second tabs spaced about the periphery of the second opening such that each second tab is between a pair of circumferentially adjacent second notches.

4. The joint in accordance with claim 3, wherein the rivet comprises a head portion coupled to the second component, and a shaft portion comprising a plurality of radial projections positioned within the plurality of second notches.

5. The joint in accordance with claim 1, wherein at least one first tab is aligned with at least one second tab to define a non-interlock zone when the first and second components are in the predetermined orientation relative to each other.

6. The joint in accordance with claim 5, wherein the interlock zone and the non-interlock zone are defined at offset circumferential locations relative to the first and second openings.

7. A wheeled apparatus comprising
a housing
an axle assembly coupled to the housing, wherein the axle assembly comprises:
a first plate comprising a first opening, wherein a plurality of first tabs and a plurality of first notches are defined along a periphery of the first opening;
a lever comprising a second opening aligned with the first opening, wherein a plurality of second tabs are defined along a periphery of the second opening, and wherein at least one second tab is aligned with at least one first notch to define an interlock zone when the first plate and the lever are in a predetermined orientation relative to each other; and
an axle comprising a first rivet end extending through the first and second openings, wherein the first rivet end secures the at least one second tab within the at least one first notch such that the first plate and the lever are rotationally interlocked.

8. The wheeled apparatus in accordance with claim 7, wherein the first plate comprises a slot configured to receive a portion of the lever therein.

9. The wheeled apparatus in accordance with claim 8, wherein at least one first tab is aligned with at least one second tab to define a non-interlock zone when the first plate and the lever are in the predetermined orientation relative to each other.

10. The wheeled apparatus in accordance with claim 9, wherein the interlock zone and the non-interlock zone are defined at offset circumferential locations relative to the first and second openings such that the non-interlock zone is positioned closer to the slot than the interlock zone.

11. The wheeled apparatus in accordance with claim 7, wherein the first plate and the lever are in a face-to-face relationship such that an interface is defined therebetween, and wherein the at least one second tab is oriented to extend across the interface for insertion within the at least one first notch.

12. The wheeled apparatus in accordance with claim 7, wherein the axle further comprises a second rivet end, the axle assembly further comprising a second plate configured to engage the second rivet end.

13. The wheeled apparatus in accordance with claim 7, wherein the lever comprises the plurality of second tabs and a plurality of second notches alternatingly arranged about the periphery of the second opening.

14. The wheeled apparatus in accordance with claim 13, wherein the axle comprises a head portion coupled to the lever, and a shaft portion comprising a plurality of radial projections positioned within the plurality of second notches.

15. A method of forming a riveted joint, the method comprising:
aligning a first opening of a first component with a second opening of a second component, wherein a plurality of first tabs and a plurality of first notches are defined along a periphery of the first opening, and wherein a plurality of second tabs and a plurality of second notches are defined along a periphery of the second opening;
orienting the first and second components such that at least one second tab is aligned with at least one first notch;
extending a rivet through the first and second openings; and
applying a force to the rivet such that the at least one second tab is secured within the at least one first notch for rotationally interlocking the first and second components.

16. The method in accordance with claim 15, wherein the first component is on a first side of the joint, and the second component is on a second side of the joint, wherein applying a force comprises applying the force from the second side of the joint.

17. The method in accordance with claim 16 further comprising:
orienting a shaft portion of the rivet to extend from the second side of the joint, wherein the shaft portion extends through the first and second openings; and
deforming the shaft portion to define a head portion coupled to the second component, and to define a plurality of radial projections configured to extend into the plurality of second notches.

18. The method in accordance with claim 16, wherein applying the force comprises biasing the at least one second tab towards the first component for insertion within the at least one first notch.

19. The method in accordance with claim 15, wherein applying a force comprises performing an orbital riveting procedure on the rivet.

20. The method in accordance with claim 15 further comprising orienting the first and second components such that at least one first tab is aligned with at least one second tab such that engagement therebetween is restricted when the force is applied.

* * * * *